(12) United States Patent
Wang et al.

(10) Patent No.: US 11,960,008 B2
(45) Date of Patent: Apr. 16, 2024

(54) METHOD AND SYSTEM FOR PSEUDO 3D MAPPING IN ROBOTIC APPLICATIONS

(71) Applicant: CMOS Sensor, Inc., Cupertino, CA (US)

(72) Inventors: Weng Lyang Wang, Saratoga, CA (US); Hui Wei, San Jose, CA (US)

(73) Assignee: CMOS Sensor, Inc., San Jose, CA (US)

(*) Notice: Subject to any disclaimer, the term of this patent is extended or adjusted under 35 U.S.C. 154(b) by 820 days.

(21) Appl. No.: 16/950,915

(22) Filed: Nov. 18, 2020

(65) Prior Publication Data
US 2021/0072396 A1    Mar. 11, 2021

Related U.S. Application Data

(63) Continuation-in-part of application No. 15/981,926, filed on May 17, 2018, now Pat. No. 11,067,673.

(51) Int. Cl.
| | | |
|---|---|---|
| *G01S 17/894* | (2020.01) | |
| *G01S 17/10* | (2020.01) | |
| *H04N 13/257* | (2018.01) | |
| *H04N 25/75* | (2023.01) | |

(52) U.S. Cl.
CPC ............ *G01S 17/894* (2020.01); *G01S 17/10* (2013.01); *H04N 13/257* (2018.05); *H04N 25/75* (2023.01)

(58) Field of Classification Search
None
See application file for complete search history.

(56) References Cited

U.S. PATENT DOCUMENTS

| | | | |
|---|---|---|---|
| 9,392,259 B2* | 7/2016 | Borowski | G01S 17/89 |
| 2015/0002629 A1* | 1/2015 | Wei | H04N 13/207 348/46 |
| 2015/0339826 A1* | 11/2015 | Buibas | H04N 13/239 901/1 |
| 2019/0323845 A1* | 10/2019 | Agarwal | B60R 11/04 |
| 2021/0089040 A1* | 3/2021 | Ebrahimi Afrouzi | A47L 9/2873 |
| 2022/0299650 A1* | 9/2022 | Forsberg | A47L 9/2805 |

* cited by examiner

*Primary Examiner* — Luke D Ratcliffe
(74) *Attorney, Agent, or Firm* — Joe Zheng

(57) ABSTRACT

Techniques of designing a sensing system for pseudo 3D mapping in robotic applications are described. According to one aspect of the present invention, an image system is designed to include at least two linear sensors, where these two linear sensors are positioned or disposed orthogonally. In one embodiment, the two linear sensors are a horizontal sensor and a vertical sensor. The horizontal sensor is used for the lidar application while the vertical sensor is provided to take videos, namely scanning the environment wherever the horizontal sensor misses. As a result, the videos can be analyzed to detect anything below or above a blind height in conjunction with the detected distance by the lidar.

18 Claims, 16 Drawing Sheets

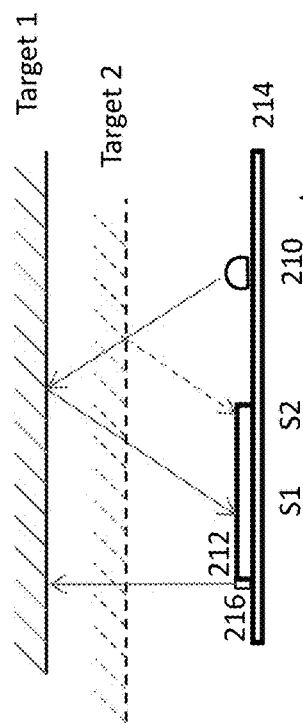
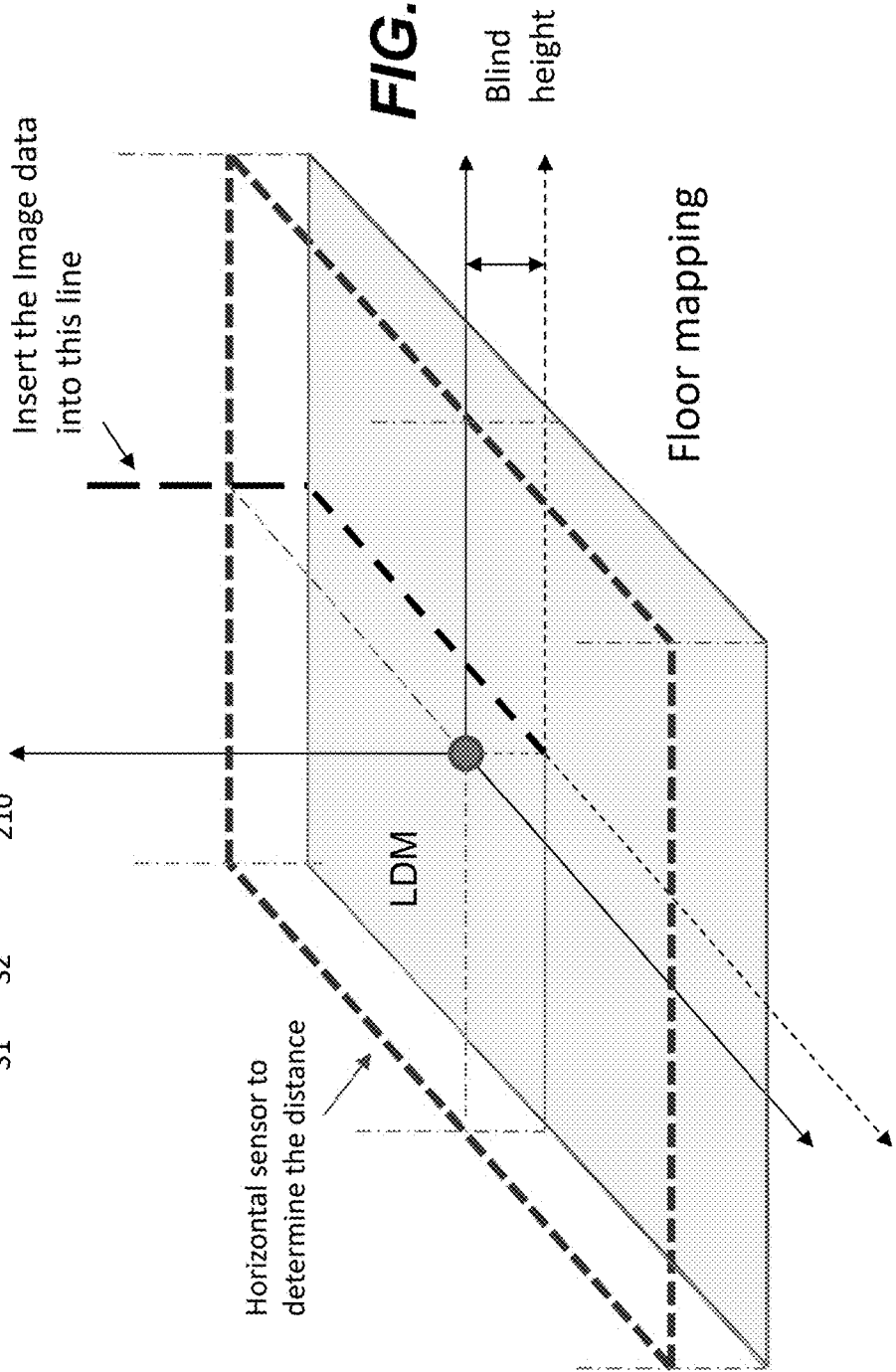

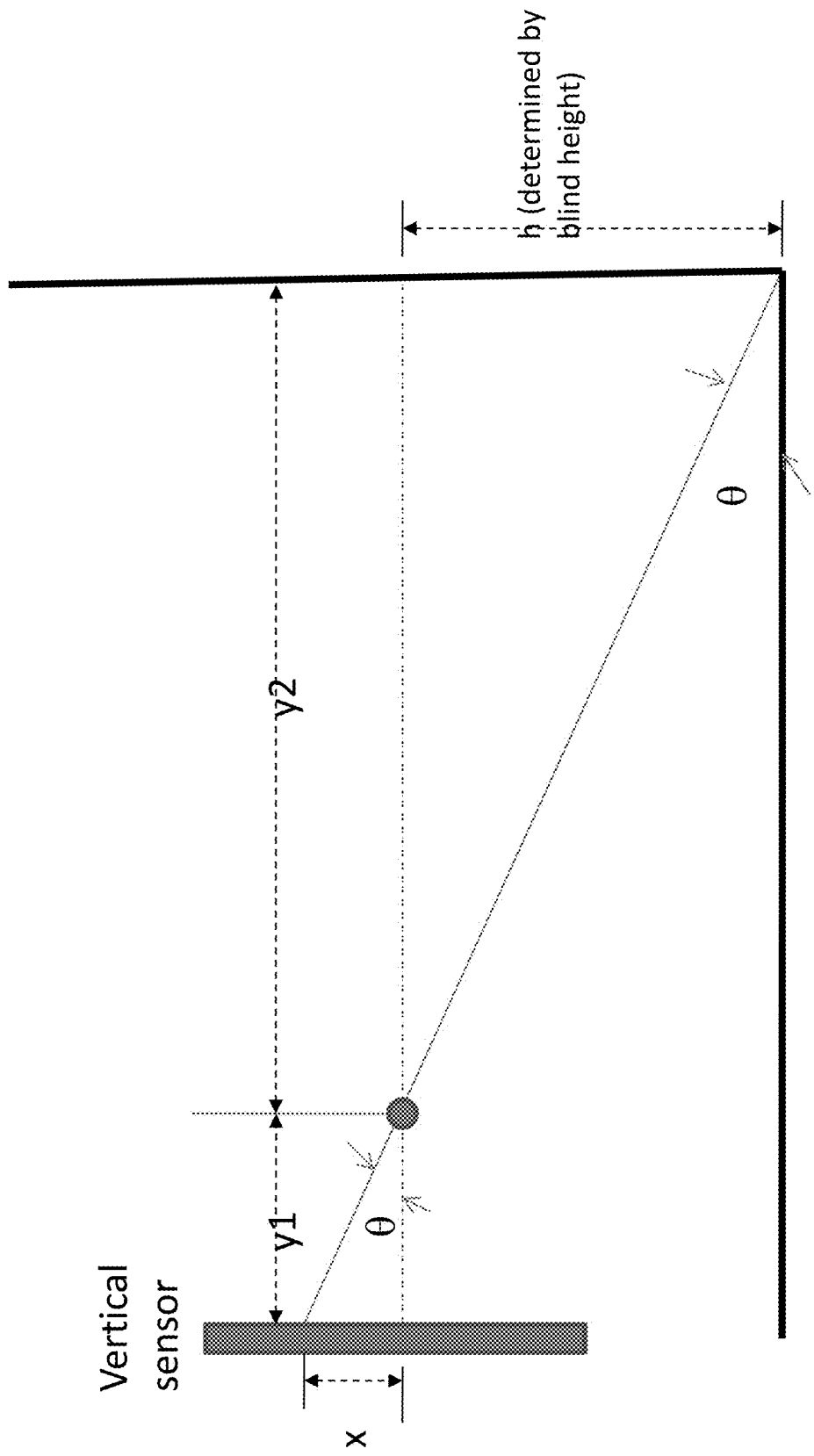

402 Photodiode (sensor or pixel element) → 404 Support circuit →

FIG. 4B

410 Vrst — reset
416 PD
Vpd
412
LGA (Unity Gain buffer Amplifier)
Vdd
row
414
col
mxa
mxd
sha
shd
418 Ch
420 Ch
CDS differential voltage:
Vcds = Vpd-Vrst
Vrst = PD reset voltage Pixel Level    Column Level

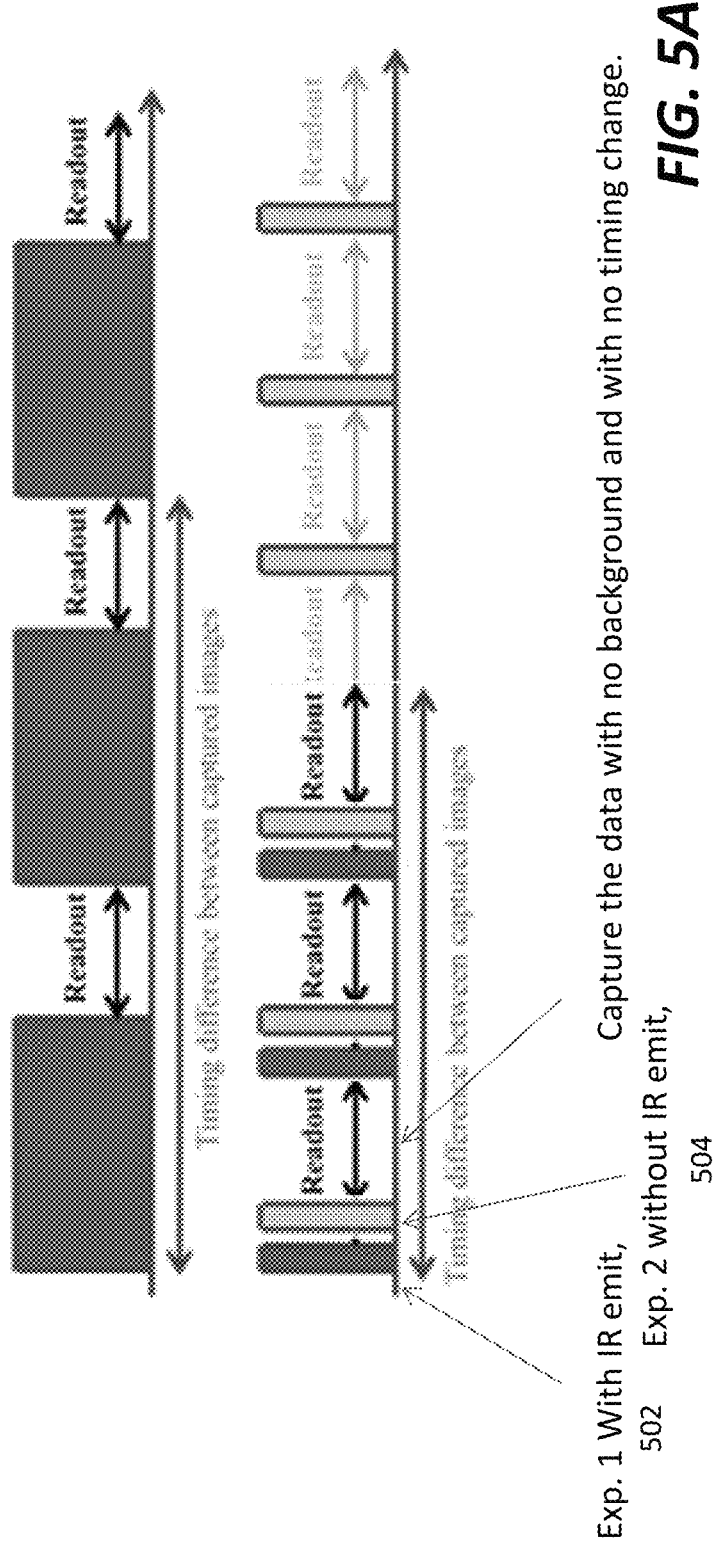

METHOD AND SYSTEM FOR PSEUDO 3D MAPPING IN ROBOTIC APPLICATIONS

CROSS-REFERENCE TO RELATED APPLICATIONS

This application is a continuation-in-part of co-pending U.S. patent application Ser. No. 15/981,926, entitled "Sensor, apparatus for lidar application and method of background cancellation", filed on May 17, 2018.

BACKGROUND OF THE INVENTION

1. Field of the Invention

The present invention is related to the area of robotic vision systems. More particularly, the present invention is related to a sensing system including at least two perpendicular image sensors provided to sense surrounding of a robot to generate a pseudo 3D model and method of using the same.

2. Description of Related Art

Mobile robotics is one of the fastest expanding fields of scientific research nowadays. With proper additional mechanisms, mobile robots can substitute humans in many applications, such as surveillance, patrolling, industrial automation, and construction. A robot is autonomous when the robot itself has the ability to determine, the actions to be taken to perform a task, using a perception system that helps it. Lidar (also called LIDAR, LiDAR, or LIDAR) is a common solution in many applications such as robotic vacuuming. It is a surveying method that measures distance to a target by illuminating the target with dot pulsed laser light and measuring the reflected pulses with a sensor. Differences in locations (or response) of the dot laser returns on the sensor are then be used to make digital 3-D representations of the target. The name lidar, now used as an acronym of light detection and ranging (sometimes light imaging, detection, and ranging), was originally a portmanteau of light and radar. Lidar sometimes is also called laser scanning and laser depth sensor scanning with terrestrial, airborne, and mobile applications.

Lidar uses ultraviolet, visible, or near infrared light to image objects. It can target a wide range of materials. FIG. 1A illustrates a configuration 100 of using a laser and an imager to detect a distance d between the laser and an object being projected with a laser, all based on triangulation. In operation, an activated dot laser 102 is provided to light the object 104. A sensor 106 is provided to detect the lighted dot or reflection on the object. Based on the preconfigured geometry of the laser 102 and the imager 106, the distance q can be derived based on triangulation.

FIG. 1B shows an exemplary environment 110 in which there is a moving object or a robotic vacuum 112 moving around in the environment. The robot 112 is equipped with a lidar. The lidar is mounted on the robot 112 and rotates 360 degree in high speed. For the floor mapping applications, the imager used in the lidar is a liner sensor. Thus the lidar can get 2D SLAM (Simultaneous Localization and Mapping) information of the surroundings. FIG. 1C shows a corresponding map of the lidar to indicate a profile of the surrounding. FIG. 1D shows a plane 114 on which the 2D SLAM information can be obtained. However, there is one obvious problem that comes with the configuration 100 or 110. The lidar can very well miss an object below a certain height (referring to as a blind height herein, e.g., 2 inches). A low profile object (e.g., excrement of house pet) on the floor would not be detected and could cause a big mess if the robot 112 runs over it. There is thus a need for a solution for sensing all objects in an environment regardless how their profiles may be. Although a full 3D imaging may be desirable, such robots may become practically expensive and complicated if a real 3D imaging system is provided. Thus there is another need for a simple solution capable of sensing low-profiled objects without full 3D imaging.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to designs of image sensors and its practical uses. According to one aspect of the present invention, an image system is designed to include at least two linear sensors, where these two linear sensors are positioned or disposed orthogonally. In one embodiment, the two linear sensors are a horizontal sensor and a vertical sensor. The horizontal sensor is used for the lidar application while the vertical sensor is provided to take videos, namely scanning the environment wherever the horizontal sensor misses. As a result, the videos can be analyzed to detect anything below or above a blind height in conjunction with the detected distance by the lidar.

The linear sensors take advantage of the architecture of CMOS sensor with correlated double sampling, or CDS, to avoid the sensing speed being halved. It is commonly known that a photosensor is read twice (i.e., first and second readouts) in CDS for removing the inherent noises from the photosensor itself. Instead of subtracting a pixel's dark or reference output level from an actual light-induced signal, a background image is managed to be captured before the second readout of the sensor and subtracted from an actual image, where the actual image is assumed to include a target. As a result, the readout speed of an image sensor is maintained while the background light interference is removed.

According to another aspect of the present invention, a 2D sensor is operated to work as multiple line sensors when the 2D sensor is used. Color filters may be added to allow the vertical sensors to generate color images. Depending on implementation, color filters may be based on a set of red, green and blue (RGB) filters or a set of RGB filters with other filter(s) (e.g., infrared or UV light).

According to still another aspect of the present invention, there are two independent storage devices (e.g., capacitors) in the photosensor, each provided to store a charge from an exposure. According to yet another aspect of the present invention, a clock signal circuit is provided to control the first and second readouts of a photosensor sensor. Clock signals are designed to ensure two independent exposures take place successively within one image frame. The two readouts stored in the capacitors from the two independent successive exposures are available from which a final signal is obtained.

The present invention may be implemented in various ways including a method, an apparatus or a system. According to one embodiment, the present invention is a sensing system comprising: at least a first linear sensor and a second linear sensor, the first linear sensor disposed horizontally provided to measure a distance towards a target as part of a lidar system, wherein the distance is measured at a predefined height from a ground; and the second linear sensor, disposed vertically, provided to take a video of an environment. The first linear sensor and the second linear sensor are in a predefined rigid relationship, image data from the second linear sensor is incorporated with the distance obtained from the first linear sensor. The sensing system is mounted on a robot moving in the environment, an image of the environment is generated from the second linear sensor synchronized with respective distances obtained from the first sensor while the robot is moving in the environment.

According to another embodiment, the present invention is a method for pseudo 3D mapping, the method comprises: measuring a distance towards a target by a first linear sensor as part of a lidar system, wherein the distance is measured at a predefined height from a ground, and scanning and generating a video of an environment by a second linear sensor. The first linear sensor and the second linear sensor are in a predefined rigid relationship. Image data from the second linear sensor is incorporated with the distance obtained from the first linear sensor, both of the first and second linear sensors are mounted on a robot moving in the environment. An image of the environment is generated from the second linear sensor synchronized with respective distances obtained from the first sensor while the robot is moving in the environment.

Different objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 2C shows that a laser diode projects a beam that hits a target, causing a reflected beam to impinge upon a horizontal sensor at a location thereof;

FIG. 2D shows an exemplary geometry of additional areas being imaged by a vertical sensor operating in video mode;

FIG. 3C shows a relationship between an angle and a blind height;

FIG. 4A shows a functional block diagram of a single pixel in an image sensor;

FIG. 4B shows an exemplary design of a sensor or pixel element with an optional amplifier and a readout circuit, where the pixel element further includes a photodiode that is controlled to be turned on or off;

FIG. 5A shows an exemplary operation of reading out the signal from a photodiode, where the signal has the background removed without reducing the sensing cycle originally designed for the image sensor;

DETAILED DESCRIPTION OF THE INVENTION

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Embodiments of the invention are discussed below with reference to FIGS. 2A-6. However, those skilled in the art will readily appreciate that the detailed description given herein with respect to these figures is for explanatory purposes as the invention extends beyond these limited embodiments.

An active-pixel sensor (APS) is an image sensor includes an integrated circuit containing an array of pixel sensors, each pixel containing a photodetector and an active amplifier. There are many types of active pixel sensors including the CMOS APS. Such an image sensor is produced by a CMOS process (and is hence also known as a CMOS sensor), and has emerged as an alternative to charge-coupled device (CCD) image sensors. Depending on an application, the image sensor may be implemented as a linear sensor or an area sensor. To facilitate the description of the present invention, the description herein is largely based on a linear array of photosensors unless explicitly stated.

Figure 2A:
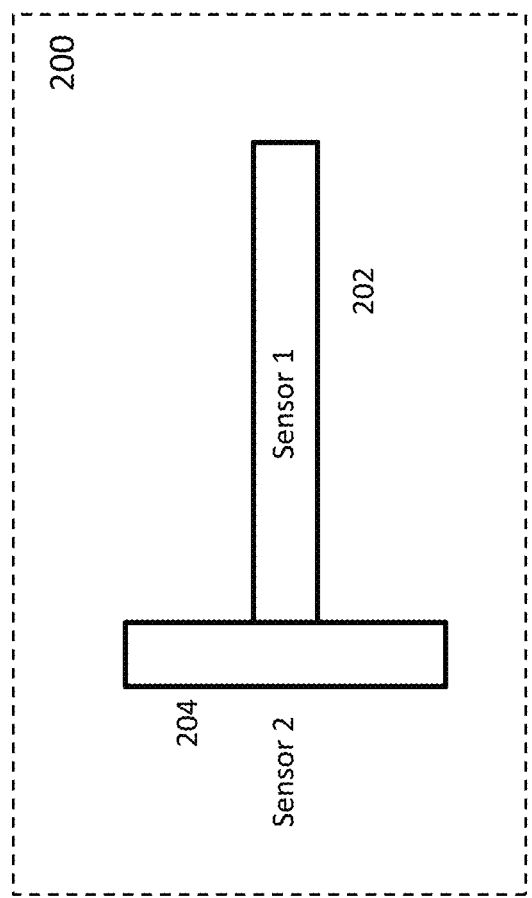
FIG. 2A shows a sensing system including at least two sensors, where these two sensors are disposed orthogonally.

FIG. 2A shows a sensing system including at least two sensors 202 and 204, where these two sensors are disposed orthogonally. In one embodiment, Sensor 1 is disposed horizontally while Sensor 2 is disposed vertically, hence a horizontal sensor and a vertical sensor. Both of the two sensors 202 and 204 are linear sensors but operate differently. The horizontal sensor 202 is primarily responsible for sensing a distance between a light source and an object while the vertical sensor 204 is primarily responsible for scanning an environment in video. In other words, the horizontal sensor 202 is provided as a part of the lidar system to detect a distance from the robot to a target at a certain height, the vertical sensor 204 is provided to scan any things towards the target. According to one embodiment, the horizontal sensor 202 is a high speed linear sensor used for distance measurement, the vertical sensor 204 is a low resolution linear sensor used for vision capture.

Figure 2B:
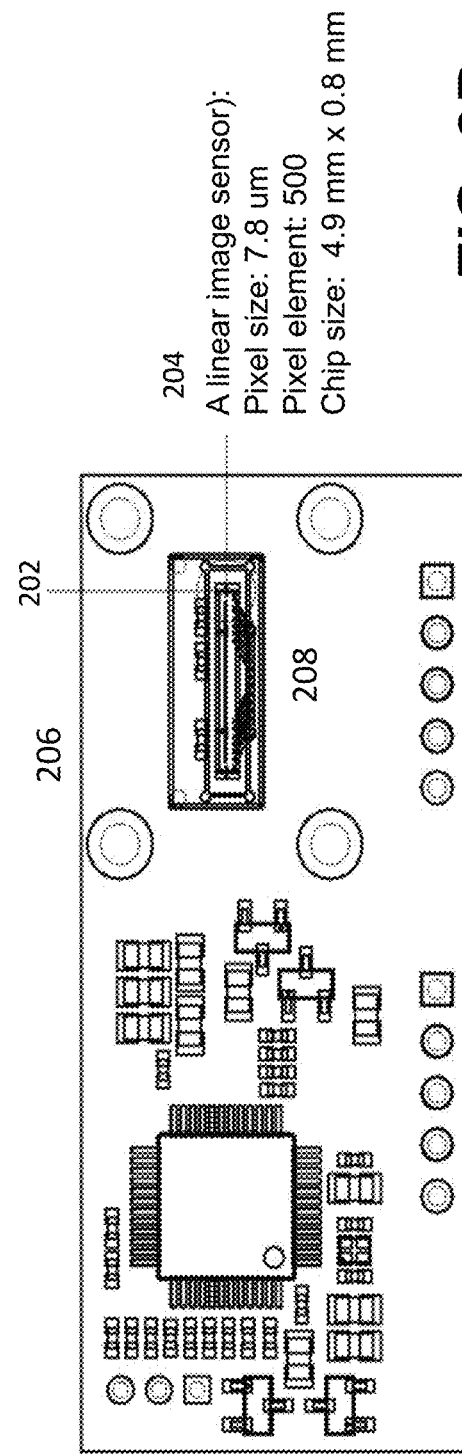
FIG. 2B shows an exemplary printed circuit board (PCB) on which there is a fixed apparatus provided to define a rigid relationship between a light source and two sensors (corresponding to the sensors of FIG. 2A)

FIG. 2B shows an exemplary printed circuit board (PCB) 206 on which there is a fixed apparatus 208 provided to define a rigid relationship between a light source and the sensors 202 and 204 (not clearly shown in FIG. 2B). Depending on implementation, the light source includes a laser diode with or without an illumination source. FIG. 2C shows that a laser diode 210 projects a beam that hits target 1, the reflected beam impinges upon a horizontal sensor 212 at location S1. Both of the laser diode 210 and the sensor 212 are mounted on a substrate 214 and maintain a predefined distance therebetween. The location of the reflected beam on the sensor 212 dictates the distance between target 1 and the substrate 214. When the beam hits target 2, the reflected beam impinges upon the sensor 212 at location S2. The updated location of the reflected beam on the sensor 212 dictates the distance between target 2 and the substrate 214.

Figure 1B:
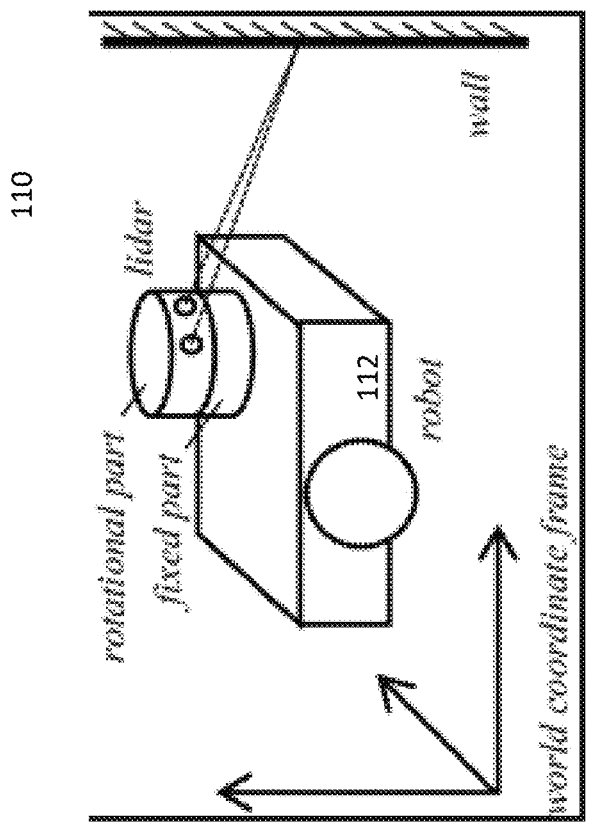
FIG. 1B shows an exemplary environment in which there is a robot moving around in the environment.
Figure 1A:
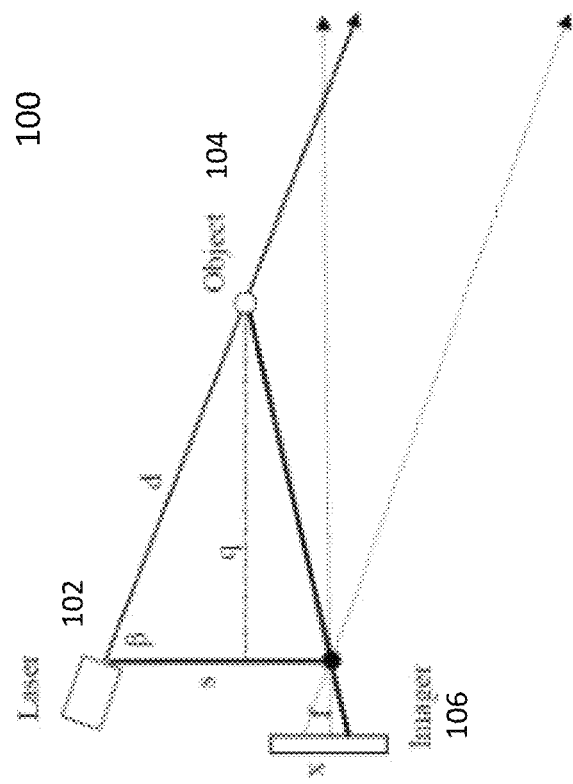
FIG. 1A illustrates a configuration of using a laser and an imager to detect a distance d between the laser and an object being impinged upon by the laser, all based on triangulation.
Figure 1C:
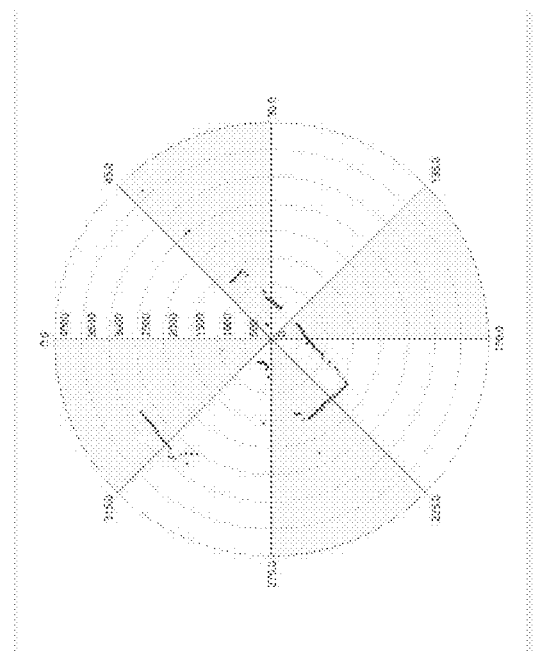
FIG. 1C shows a corresponding map from a lidar to indicate a profile of an exemplary surrounding.
Figure 1D:
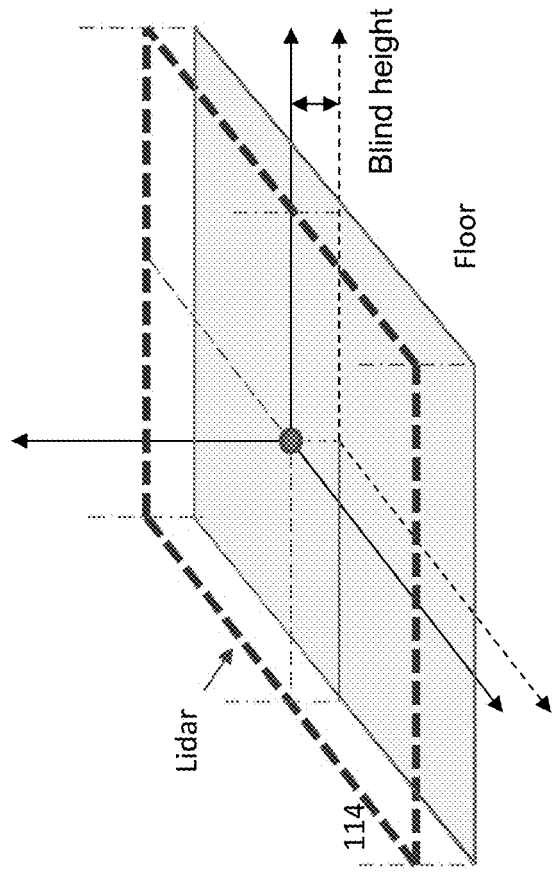
FIG. 1D shows a surface plane on which 2D information may be obtained from the lidar.

A vertical sensor 216, on either one side of the horizontal sensor 212, is disposed orthogonally to and maintains a predefined relationship with the horizontal sensor 212. It captures a line of video on the target in front of it. FIG. 2D shows an exemplary geometry of the additional areas being imaged by the vertical sensor 216. As the robot 112 of FIG. 1B rotates, the vertical sensor 216 scans the environment vertically. Together with the distance obtained from the lidar system, it is possible to detect objects with low profiles in the image data generated from the vertical sensor 216.

Figures 2E, 2F:
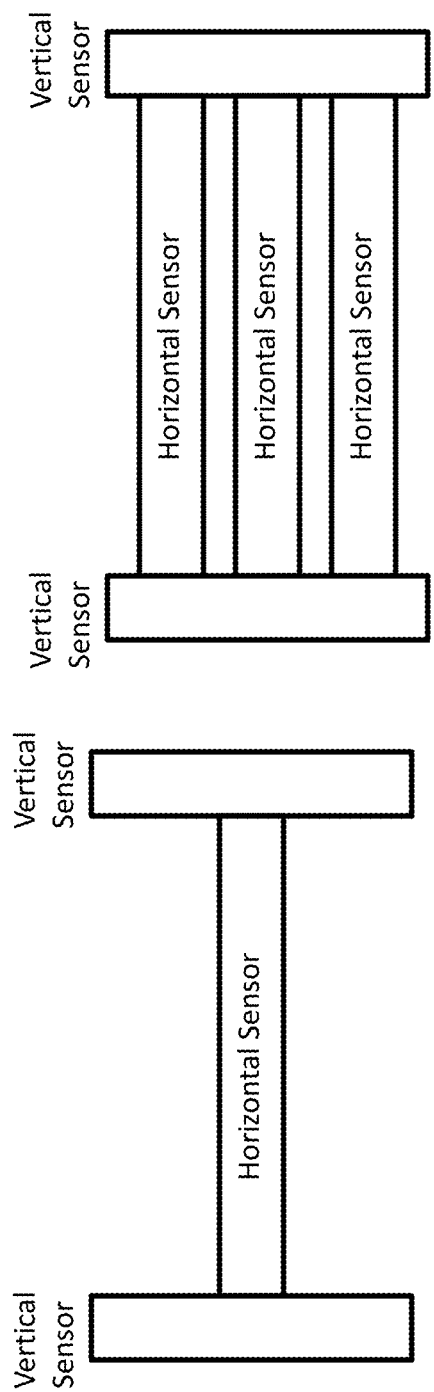
FIG. 2E and FIG. 2F each show another embodiment in which more than one horizontal or vertical sensor is used.

FIG. 2E and FIG. 2F each show another embodiment in which more than one horizontal or vertical sensor is used. Depending on implementation, one of two vertical sensors may be coated with a filter to ensure a low-profiled object could be seen. In general, a vertical linear sensor generates image data to indicate light intensity in the environment (assuming via digitalization and other signal preprocessing). In some situations, it is not easy from signal processing perspective to detect certain objects. When a second vertical linear sensor is coated with a special filter, certain colors of the objects are highlighted. The detection of the objects in the intensity image and/or filtered image becomes more feasible than otherwise a single (intensity) linear sensor. There are a range of filters that can transmit desired wavelengths through to the photodiodes while filtering out other wavelengths. These filters include bandpass filters, color filters and IR filters, and they can be used to enhance image quality based on a number of characteristics. For example, by isolating certain light wavelengths, imaging filters may be used to control camera exposure or image contrast on a digital camera.

FIG. 2F shows an implementation of using multiple horizontal sensors to detect several distances at different levels. In one perspective, there are more than one lidar systems in use to detect several distances to an object before the moving robot. One of the advantages in obtaining several respective distances to ensure the distance that will be used in the image data from the vertical sensor is accurate. In some cases, a reflected beam from the object may be distorted because of certain surface characteristics of the target. As will be further described herein, additional processing is designed to ensure a correct reflected beam impinges upon the horizontal sensor(s).

Figure 2G:
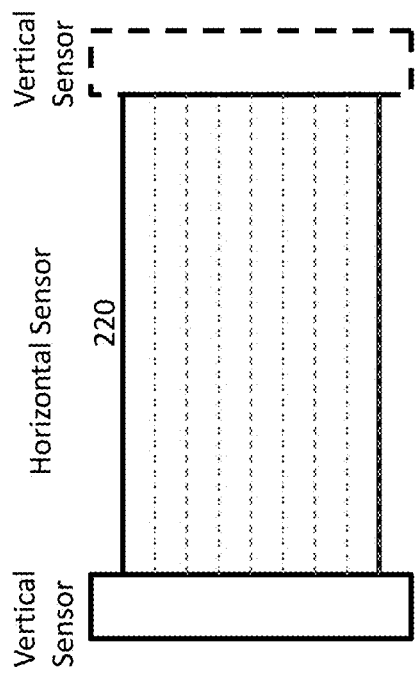
FIG. 2G shows a combination of an area sensor and one or more linear sensor, where the area sensor is provided to act as an array of horizontal sensors, capable of detecting a plurality of distances to the surface of a target.
Figure 2I:
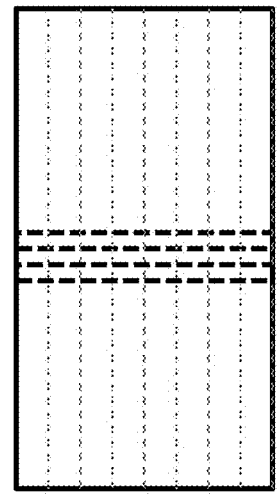
FIG. 2I extends from FIG. 2H by allocating vertically more than one arrays of photosensors, each of the array of photosensors is coated with or disposed thereon a particular filter.
Figure 2H:
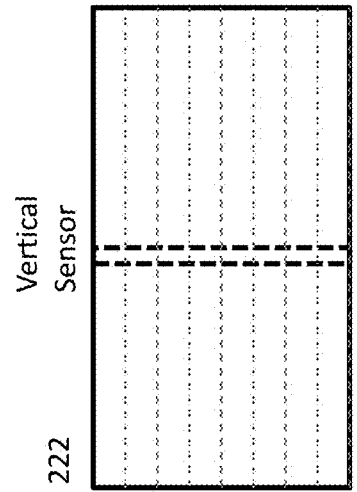
FIG. 2H shows the use of an area sensor, where a vertical array of photosensors on the area sensor is allocated to act as a vertical sensor and one or more horizontal arrays of photosensors to act as one or more horizontal sensors.

FIG. 2G shows a combination of an area sensor 220 and one or more linear sensor, where the area sensor 220 is provided to act as an array of horizontal sensors, capable of detecting a plurality of distances to the surface of a target. Those skilled in the art shall understand how to read out lines of sensor signals from an area sensor 220. The details of such circuitry are beyond the scope of the present invention and will not be further described herein. FIG. 2H shows the use of an area sensor 222, where a vertical array of photosensors on the area sensor 222 is allocated to act as a vertical sensor and one or more horizontal arrays of photosensors to act as one or more horizontal sensors. FIG. 2I extends from FIG. 2H by allocating vertically more than one arrays of photosensors, each of the array of photosensors is coated with or disposed thereon a particular filter. For example, when there are three vertical arrays of photosensors, three corresponding arrays of color filters (e.g., red, green and blue) may be used to cover three vertical arrays of photosensors hence one red vertical linear sensor, one green vertical linear sensor and one blue vertical linear sensor. As a result, the image data from these three colored linear sensors can reproduce the full color of the environment.

Figure 3A:
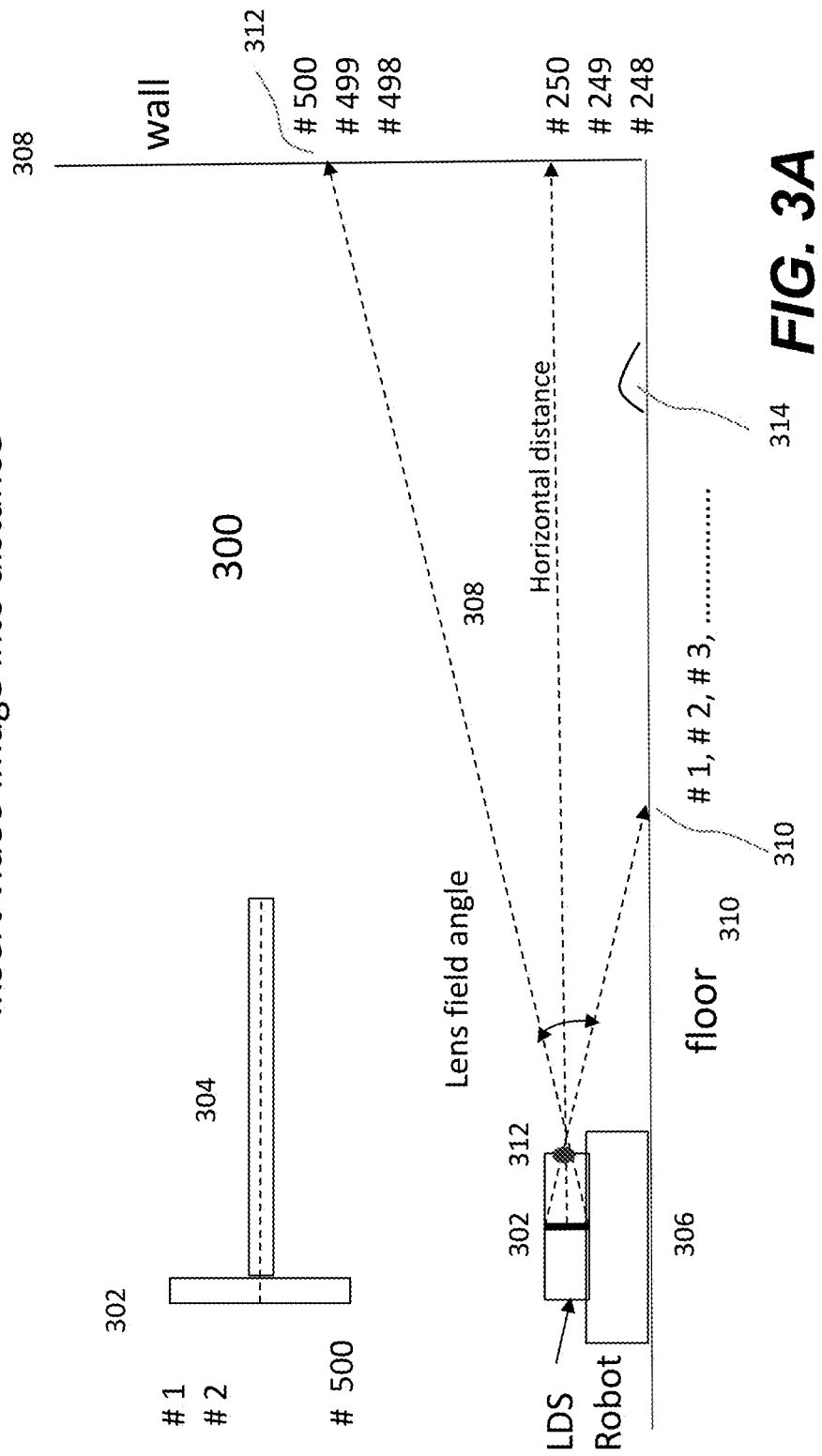
FIG. 3A illustrates an exemplary configuration in which a sensing system including at least one vertical sensor and one horizontal sensor is disposed on a moving robot.

Referring now to FIG. 3A, it illustrates a configuration 300 in which a sensing system including at least one vertical sensor 302 and one horizontal sensor 304 is disposed on a moving robot 306. As described above, the horizontal sensor 304 is part of a lidar system that detects a distance horizontally between the robot 306 and a target 308. As shown in FIG. 2D, the horizontal distance is measured at a blind height (e.g., 2 inches). Should there be something on the floor, it would not be detected by the horizontal sensor 304. FIG. 3A shows that the vertical sensor 302 generates image data covering a range from a point 310 on the floor to a point 312 on the target. It is assumed that there are 500 pixels on the sensor 302 (labeled as #1, #2, . . . #500 in FIG. 3A). Accordingly, an image of the covered range between 310 and 312 is distributed over these 500 pixels. It is assumed that there is a tiny object 314 in low profile that evidently cannot be seen by the lidar. An image of the object 314, however, will be captured by the vertical sensor 302. In operation, image data from the vertical sensor 302 is quickly processed to detect something that looks suspicious in the data. If there is an indication that there is indeed something in the scene, the horizontal distance obtained by the lidar is used to verify if the detected object is within the distance. If it is within the distance, the robot would be instructed not to run over it or simply go around it. Further processing of the image data may be added to determine a fairly accurate distance towards the object 314 by evaluating a distance across the number of pixels covering the object in the image data (e.g., a distance across three pixels #265, #266 and #267), given the known sizes of the pixels and their gaps in the vertical sensor 302.

It is assumed that there are 500 photosensors or elements on the sensor 302. The vertical sensor 302 captures a line of scene while the horizontal sensor 304 detects a distance at a predefined height (e.g., a blind height of FIG. 2D or 2.35 inches) towards a target (wall) by capturing a reflected beam from the target. In operation, every scan line of the scene is associated with a detected distance. Given the known distance of the sequence of these affected photosensors and the distance between the sensor 302 and the focal point of the lens 312, the height of the target can be determined based on similar triangles theorem.

Figure 3B:
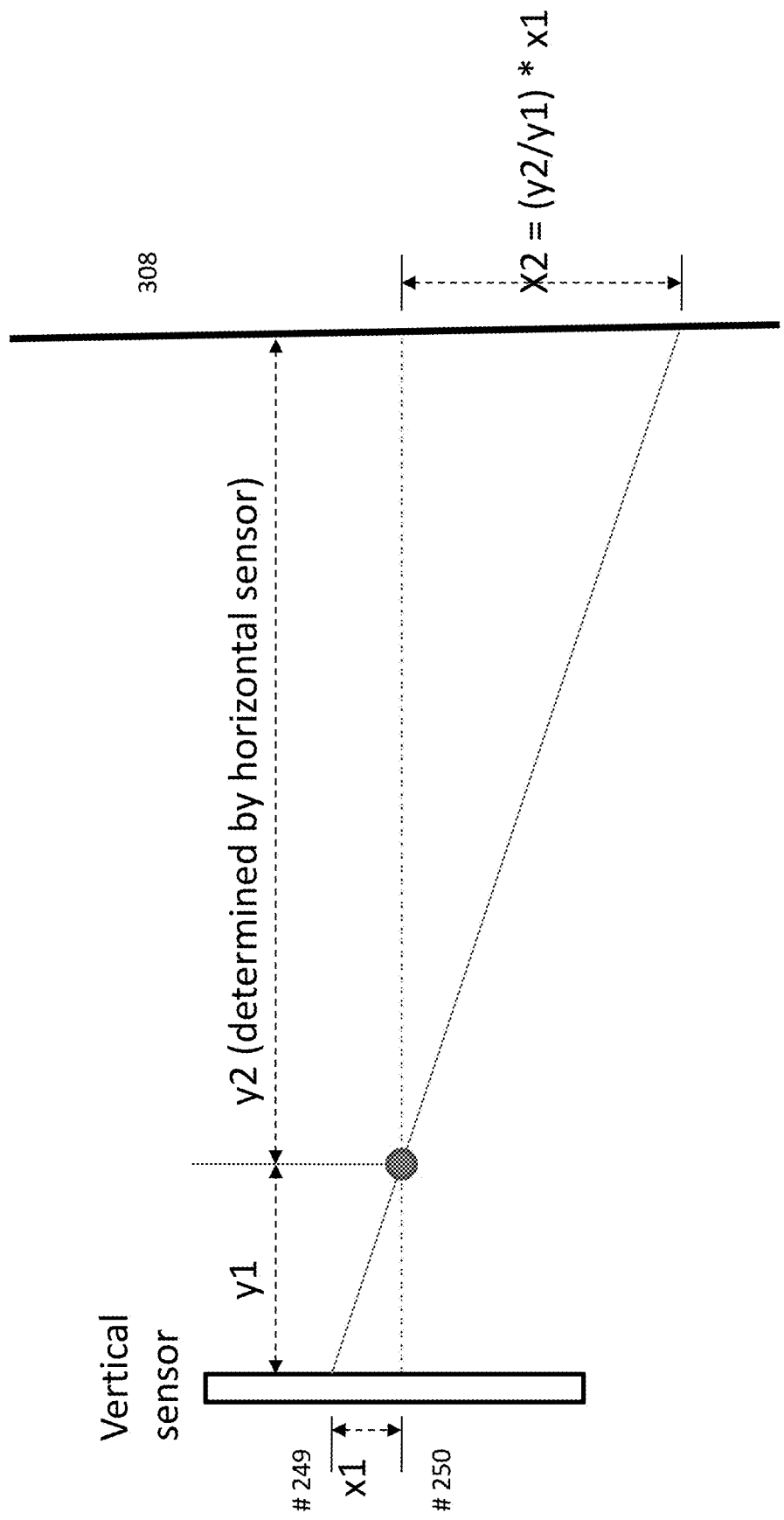
FIG. 3B shows how a distance between two photosensors #249 and #250 can be used to determine a height of the target.
Figure 3D:
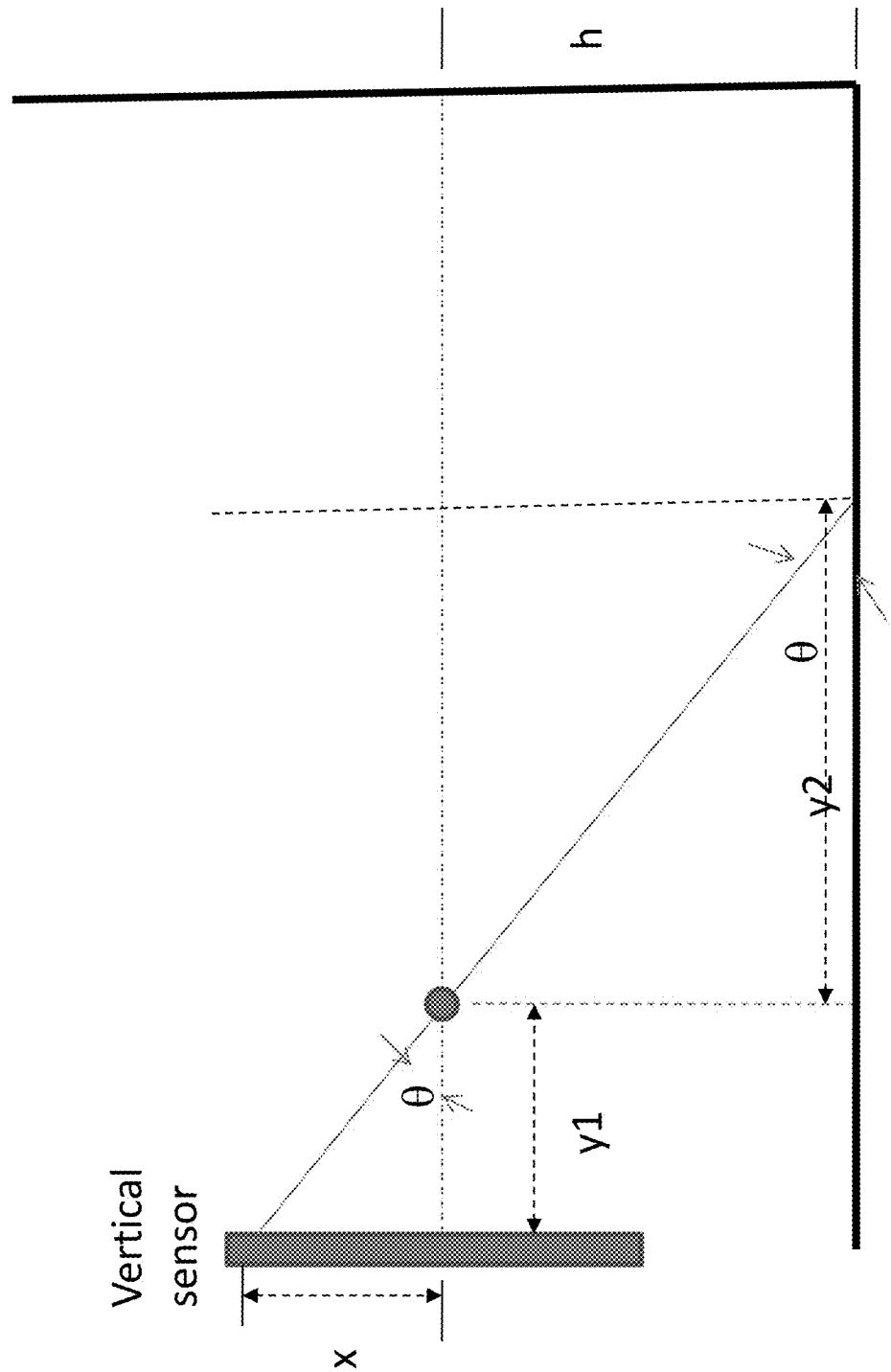
FIG. 3D shows how a sensor distance is used to determine a distance of an object in a visual image generated by the vertical sensor.
Figure 3E:
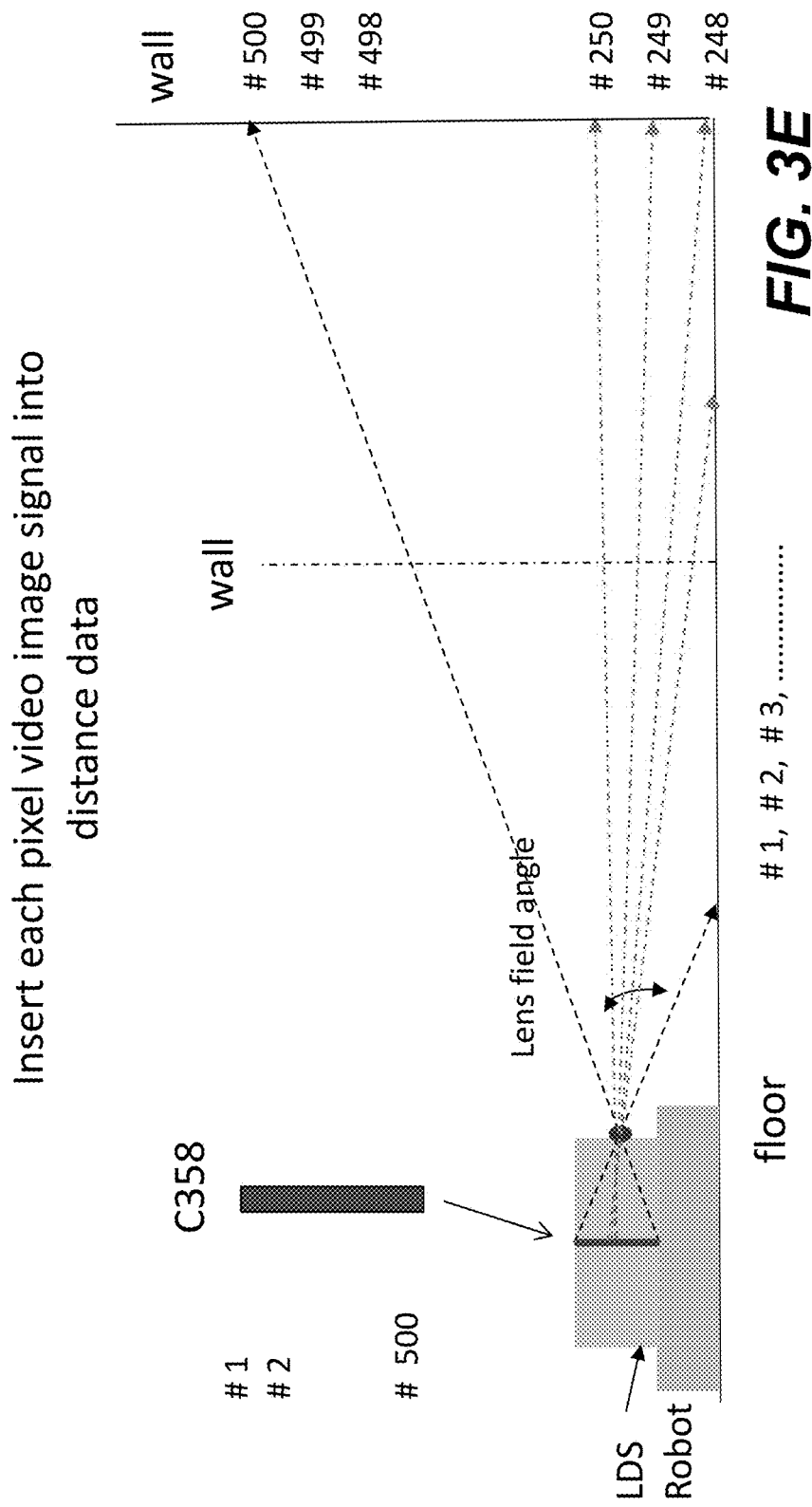
FIG. 3E shows the image data from each of the photosensors on the vertical sensor can be associated with the distance obtained from the horizontal sensor or vice versa.

FIG. 3B shows how a distance between two photosensors #249 and #250 can be used to determine a height of the target 308. FIG. 3C shows a relationship between an angle and a blind height. FIG. 3D shows how a sensor distance is used to determine a distance of an object in a visual image generated by the vertical sensor. With the detected distance for each scanning by the vertical sensor, the image data from the vertical sensor, FIG. 3E shows the image data from each of the photosensors on the vertical sensor can be associated with the distance obtained from the horizontal sensor or vice versa.

FIG. 4A shows a functional block diagram 400 of a single pixel 402 in an image sensor that may correspond to a linear horizontal sensor 202 and a vertical sensor 204 of FIG. 2A, and other image sensors used in one embodiment of the present invention. When the image sensor (an array of such pixels) is exposed (e.g., via a shutter or circuit control) to a scene, a charge proportional to the incoming light intensity is accumulated in the pixel 402. A supporting circuit 404 is provided to read out the charge. FIG. 4B shows an exemplary design of a photosensor or pixel element 410 with an amplifier 412 and a readout circuit 414. The pixel element 410 further includes a photodiode 416 that is controlled to be turned on or off.

The amplifier 412 is an amplifier provided to amplify the signal produced by the photodiode 416. As an example shown in FIG. 4B, the amplifier 412 is implemented with what is called unity gain buffer amplifier (UGBA). As the name suggests, the amplifier is one that provides electrical impedance transformation from one circuit to another, with the aim of preventing a signal source from being affected by whatever currents or voltages that the load may produce. The readout circuit 414 in FIG. 4B uses an exemplary readout circuit provided to read out the charge accumulated in proportional to the intensity of the light impinged on the diode 416. As an exemplary, the readout circuit 414 is implemented with correlated double sampling (CDS) circuitry to read out the sensing signal from the pixel 410. Another amplifier (not shown) may also be added as a charge integrator to produce a final sensing signal to be coupled for digitization.

The correlated double sampling, or CDS, circuitry is a method employed to improve the signal to noise ratio (S/N) of an image sensor by reading out the pixel 410 twice. The first readout happens right after the exposure of the sensor to a scene. The second readout happens without the sensor is exposed to the scene but soon after the first readout has successfully occurred. Accordingly, the first readout is herein referred to as actual light-induced signal while the second readout is referred to as a reference signal. The reference signal is largely coming from internal dark or reference output level in the pixel. By subtracting the reference output signal from the actual light-induced signal, static fixed pattern noise (FPN) and several types of temporal noise are effectively removed from the output of the sensor. In operation, the first readout of the signal from the photosensor 416 is stored on a capacitor 418 and the second readout the signal from the photosensor 416 is stored on a capacitor 420. The final readout of the signal is the difference between the signals on the capacitors 418 and 420.

Referring now to FIG. 5A, it shows an exemplary operation of reading out a final sensing signal from a photosensor, where the sensing signal has the background removed without reducing the sensing cycle originally designed for an image sensor. Based on the principles of the CDS, according to one embodiment, after the exposure 502 to a scene with an IR light is impinged upon an object, another exposure 504 follows immediately without having the light emitted. The signal from the first exposure is stored on the capacitor 418 of FIG. 4B and the signal from the second exposure is stored on the capacitor 420. The final readout of the signal is the difference between the signals on the capacitors 418 and 420. It can be noticed, compared to the prior art solution, that there is no need to wait for the first exposure to finish (read out) before the second exposure takes place. As a result, a clean image without the background light interference is obtained within one frame of time.

Figure 5B:
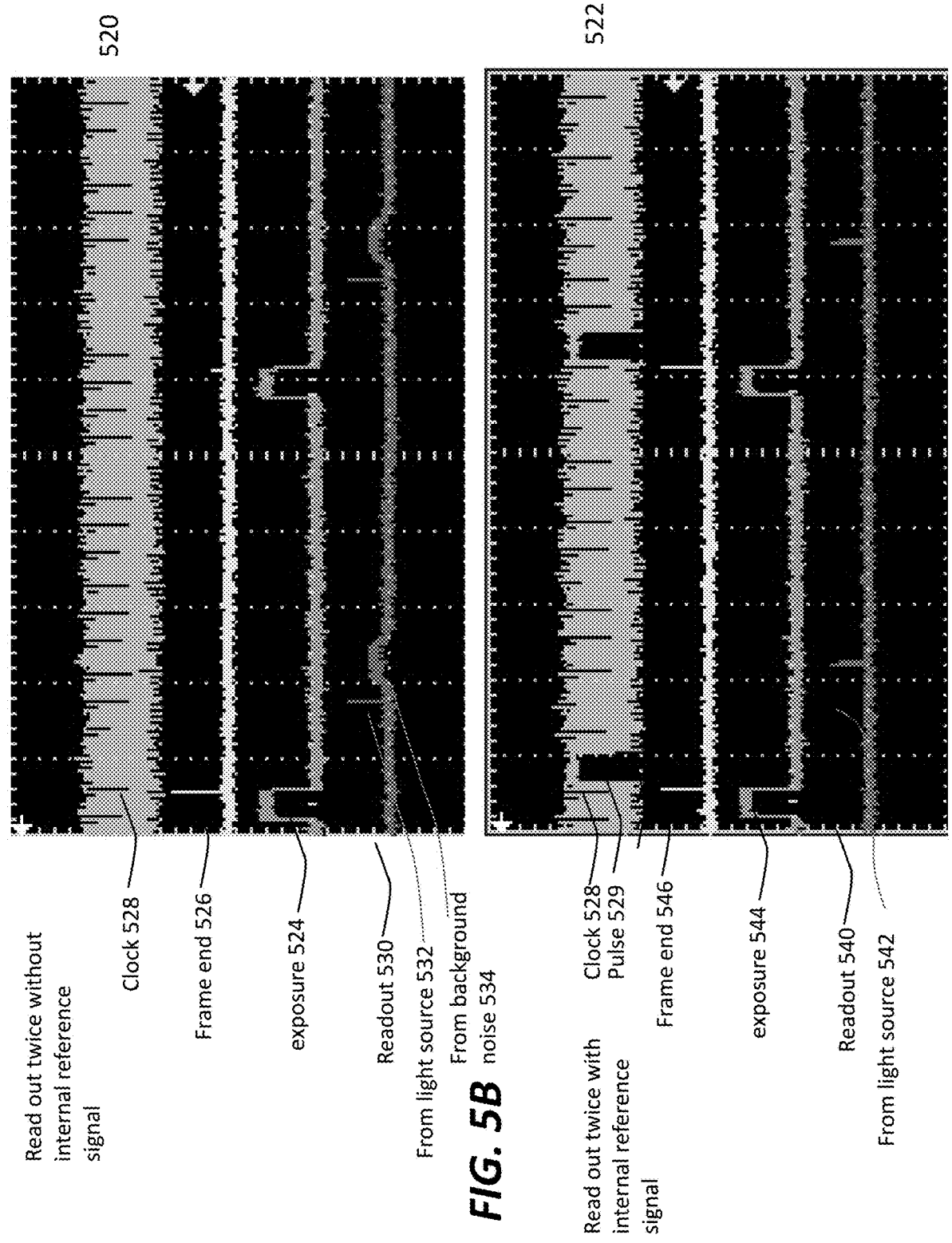
FIG. 5B shows two sets of signals according to one embodiment of the present invention.

FIG. 5B shows two sets of signals 520 and 522 according to one embodiment of the present invention. As an example and a comparison, the signals set 520 are used to read out the signal from a sensor according to the CDS. The curve 524 shows that an exposure is activated. A pulse 526 is provided to signal the end of the exposure and cause a clock signal 528 to start the second readout according to the CDS. In other words, the second readout is based on the internal reference signal from the sensor without having the sensor exposed to the scene. The resulting readout from the sensor is shown as 530 and includes signals 532 pertaining to the background lights besides the signal 534 of the reflected light dot from the emitted light (e.g., visible or invisible laser or infrared) from a light source disposed next to the sensor in a predefined configuration.

The signals set 522 shows the clock signal 528 is modified or redesigned by including a pulse 529 (e.g., the width of pulse may be adjusted to substantially that of the exposure pulse 544) to disable the second readout from the photodiode. Instead, the pulse 529 causes the sensor to be immediately exposed to the scene with the light source turned off. The resultant readout from the sensor is shown as 540 and includes the signal 542 of the reflected light dot from the emitted light (e.g., visible or invisible laser or infrared) from a light source disposed next to the sensor in a predefined configuration.

Figure 6:
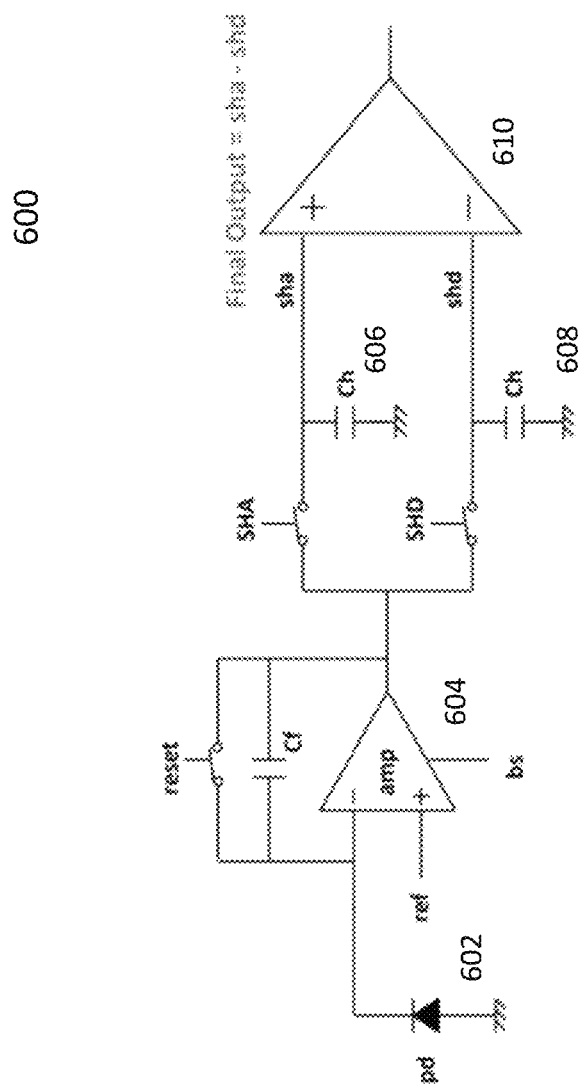
FIG. 6 shows an exemplary circuit according to one embodiment of the present invention.

Referring now to FIG. 6, it shows an exemplary circuit 600 that may be used to implement one embodiment of the present invention with the reference to the clock signals in the signals set 522 of FIG. 5B. The circuit 600 represents one photodiode or photosensor in an image sensor that may be a CMOS-based linear or area sensor. A photodiode 602 is turned on (to be exposed to a scene) and off. Upon a clock signal, the photodiode 602 is turned on for a period in an image frame (e.g., 1/30 second), a first signal is generated by the photodiode 602, where the first signal or intensity thereof is proportional to an intensity of an incoming light impinged upon the photodiode 602. The first signal is then amplified in an amplifier 604. A first readout takes place by charging a storage device (e.g., a capacitor 606) with the amplified signal from the amplifier 604. Immediately right after the first signal is read out onto the capacitor 606 (controlled via a switch SHA by a clock signal), the photodiode 602 is turned on again for a period within the same image frame. A second signal is generated by the photodiode 602, where the second signal or intensity thereof is proportional to an intensity of an incoming light impinged upon the photodiode 602. Similar to the first signal, the second signal is then amplified in the amplifier 604. A second readout (controlled via a switch SHD by a clock signal) takes place by charging another storage device (e.g., a capacitor 608) with the amplified signal from the amplifier 604. The final output (signal) is the subtraction between the two charges on the two different capacitors 606 and 608.

In operation, there are essentially two successive exposures with the photodiode 602. In one embodiment, the first exposure is a scene with a light source turned off. The charge on the capacitor 606 pertains to a background. If there are ambient lights in the background, the charge on the capacitor 606 would capture the ambient lights. The second exposure is a scene with a light source turned on. In other words, an object is being illuminated by a projected light from a light source with a known configuration with respect to the image sensor (e.g., the photodiode 602). The charge on the capacitor 608 pertains to the background as well as the reflection of the light on the object. An adder 610 is provided to perform the subtraction between the two charges on the two different capacitors 606 and 608, namely subtracting the background from the second charge. As a result, the final signal presents a clean reflection of the projected light.

According to one embodiment, the present invention may be realized by a clock signal circuit to control an existing CMOS image sensor, where the clock signal circuit generates one or more signals, at least one of the signals is used to modify the clock signal 528. The modified signal is shown correspondingly in the signal set 522. One of the advantages, benefits and objectives in this implementation is to take advantages of the existing CMOS sensors to realize one embodiment of the present invention.

Figure 7:
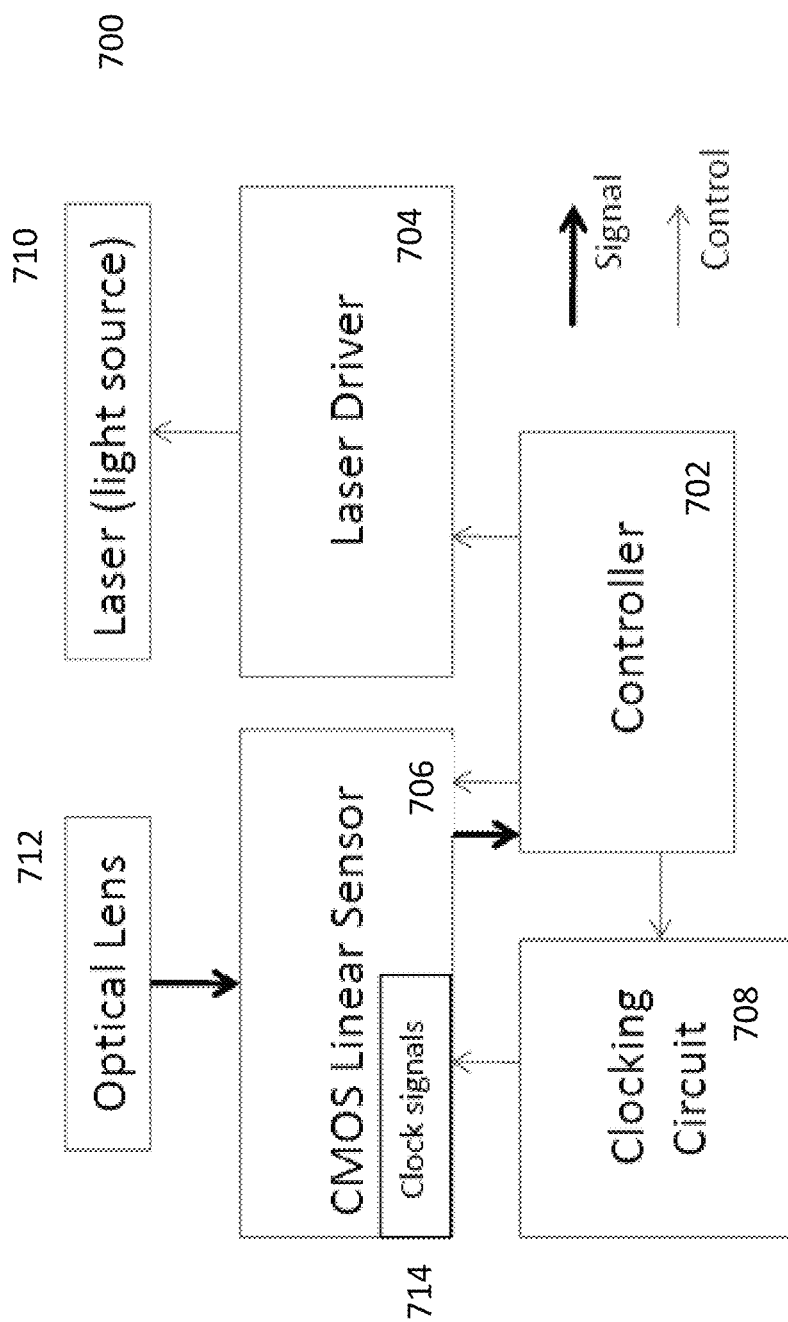
FIG. 7 shows an exemplary system block diagram in which the present invention can be used according to one embodiment of the present invention.

FIG. 7 shows an exemplary system block diagram 700 in which one embodiment of the present invention may be implemented. A controller 702 is provided to synchronize the operations of a laser driver 704, a sensor 706 and a clocking circuit 708. In operation, the controller 702 controls when a light source 710 is turned on or off as well as when a scene is captured by the sensor 706 via a lens. One of the important features, benefits and advantages of the present invention is the use of the clocking circuit 708 to control the clock signals 714. Depending on the implementation, the clock signals 714 may be provided or generated internally or externally for the sensor 706 to operate normally. In the prior art, one of the clock signals 714 (e.g., the clock signal 528 in the signals set 522) is used to generate the internal dark or reference output level. In the embodiment, the clocking circuit 708 generates one or more clock signals to control/modify the clock signals 714. In particular, as shown in FIG. 5A, the clock signal 528 (i.e., one of the clock signals 714) is modified via an output from the clocking circuit 708 to the corresponding clock signal in the signals set 522. In another perspective of the clock signal 528, assuming that a first pulse is used to trigger an exposure and a second pulse is used to generate the internal dark or reference output level, one or more of the clock signals 714 is used to suppress or stop the second pulse and instead cause a second exposure. As a result, there are two charges available in the pixel before a final signal is read out. With this embodiment, the background light interference can be effectively removed without significant changes to the sensor 706.

According to another embodiment, a circuit for generating the clock signals 714 may be simply modified to generate the corresponding clock signal in the signals set 522 to effectively control the operation of the sensor 706, resulting in two successive exposures to cancel the background light interference, wherein charges from the two successive exposures are retained within a pixel before a final readout is obtained from the pixel.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. While the embodiments discussed herein may appear to include some limitations as to the presentation of the information units, in terms of the format and arrangement, the invention has applicability well beyond such embodiment, which can be appreciated by those skilled in the art. Accordingly, the scope of the present invention is defined by the appended claims rather than the forgoing description of embodiments.

We claim:

1. A sensing system for pseudo 3D mapping, the sensing system comprising:
at least a first linear sensor and a second linear sensor;
the first linear sensor, disposed horizontally, provided to measure a distance towards a target, wherein the distance is measured at a predefined height from a ground; and
the second linear sensor, disposed vertically, provided to take a video of an environment, wherein the first linear sensor and the second linear sensor are in a predefined rigid relationship, image data from the second linear sensor is incorporated with the distance obtained from the first linear sensor, the sensing system is mounted on a robot moving in the environment, an image of the environment is generated from the second linear sensor synchronized with respective distances obtained from the first linear sensor while the robot is moving in the environment.

2. The sensing system as recited in claim 1, wherein the second linear sensor includes a filter to specifically enhance certain colors of objects.

3. The sensing system as recited in claim 1, wherein the second linear sensor includes a predefined number of photosensors, a sensor distance between any two of the photosensors is known, the sensor distance is used to determine how far an object is from the robot, wherein the object has a height less than the predefined height from the ground.

4. The sensing system as recited in claim 3, wherein the object cannot be detected by the first linear sensor alone.

5. The sensing system as recited in claim 4, wherein the object is present in the image data and detectable in accordance with the distance from the first linear sensor.

6. The sensing system as recited in claim 1, wherein both of the first and second linear sensors are CMOS based with correlated double sampling (CDS) to avoid a sensing speed being halved.

7. The sensing system as recited in claim 1, where the first linear sensor includes:
a linear array of pixels, each of the pixels including one photosensor and producing a final signal within a predefined frame, wherein the final signal captures a reflected light without background light interference;

a readout circuit including at least a first storage device and a second storage device; and a clock circuit, coupled to the sensor and the readout circuit, causing the readout circuit to store a first charge and a second charge on the first storage device and the second storage, respectively, wherein the first charge or the second charge is proportional to an intensity of an incoming light impinged upon the photosensor, the first charge and the second charge are created successively within the predefined frame, and the final signal is a subtraction between the first charge and the second charge.

8. The sensing system as recited in claim 7, wherein the reflected light is produced by reflection from an object impinged upon by an emitted light from a light source, wherein the light source and the first linear sensor are disposed in a known configuration.

9. The sensing system as recited in claim 8, wherein the target is positioned in a background with other ambient lights, and the first charge pertains to the incoming light with the light source turned on, and the second charge pertains to the incoming light with the light source turned off.

10. The sensing system as recited in claim 9, wherein the readout circuit includes at least a switch to control which one of the first and second storage devices is used to store the first charge or the second charge, none of the first and second charges is from an internal dark or reference output level in the photosensor.

11. The sensing system as recited in claim 10, wherein the second charge is generated while the first charge remains in the first storage device.

12. The sensing system as recited in claim 11, wherein either one of the first and second storage devices is a capacitor.

13. The sensing system as recited in claim 1, wherein the first linear sensor is artificially allocated from a 2D image sensor.

14. The sensing system as recited in claim 13, wherein the second linear sensor is artificially allocated from the 2D image sensor.

15. The sensing system as recited in claim 13, wherein the second linear sensor is one or more vertical sensors artificially allocated from the 2D image sensor, each of the vertical sensors is coated with a different filter.

16. A method for pseudo 3D mapping, the method comprising:

measuring a distance towards a target by a first linear sensor as part of a lidar system, wherein the distance is measured at a predefined height from a ground;

scanning and generating a video of an environment by a second linear sensor, wherein the first linear sensor and the second linear sensor are in a predefined rigid relationship, image data from the second linear sensor is incorporated with the distance obtained from the first linear sensor, both of the first and second linear sensors are mounted on a robot moving in the environment, an image of the environment is generated from the second linear sensor synchronized with respective distances obtained from the first sensor while the robot is moving in the environment.

17. The method for pseudo 3D mapping as recited in claim 16, wherein the second linear sensor includes a filter to specifically enhance certain colors of the objects.

18. The method for pseudo 3D mapping as recited in claim 17, wherein the second linear sensor includes a predefined number of photosensors, a sensor distance between any two of the photosensors is known, the sensor distance is used to determine how far an object is from the robot, wherein the object has a height less than the predefined height from the ground.

* * * * *